United States Patent [19]

Sugiyama et al.

[11] Patent Number: 4,929,712

[45] Date of Patent: May 29, 1990

[54] POLYACETAL RESIN COMPOSITION

[75] Inventors: Noriyuki Sugiyama, Shizuoka; Mitsuhiro Mochizuki, Fuji, both of Japan

[73] Assignee: Polyplastics Co., Ltd., Osaka, Japan

[21] Appl. No.: 371,067

[22] Filed: Jun. 26, 1989

[30] Foreign Application Priority Data

Jul. 4, 1988 [JP] Japan .................................. 63-166387
Mar. 13, 1989 [JP] Japan ........................................ 60232

[51] Int. Cl.⁵ .............................................. C08G 2/00
[52] U.S. Cl. ...................................... 528/230; 528/76; 528/79; 528/80; 528/82; 528/83; 528/85; 528/245; 528/266; 528/393; 528/403
[58] Field of Search ................. 528/230, 245, 266, 76, 528/79, 80, 82, 83, 85, 393, 403

[56] References Cited

U.S. PATENT DOCUMENTS

| | | | |
|---|---|---|---|
| 4,665,126 | 5/1987 | Kusumgar et al. | 525/66 |
| 4,689,373 | 8/1987 | Auerbach et al. | 525/398 |
| 4,828,755 | 5/1989 | Kusumgar et al. | 252/511 |

Primary Examiner—John Kight, III
Assistant Examiner—Sam A. Acquah
Attorney, Agent, or Firm—Nixon & Vanderhye

[57] ABSTRACT

A polyacetal resin composition is prepared by melt-kneading a polyacetal resin (A) (99 to 40 wt. %) with a thermoplastic polyurethane (B) (1 to 60 wt. %) in the presence of a polyisocyanate compound, a polyisothiocyanate compound or a modification thereof (C) in an amount of 0.1 to 10 wt. % based on the total of A and B.

14 Claims, 1 Drawing Sheet

POLYACETAL RESIN COMPOSITION

The present invention relates to a polyacetal resin composition. In particular, the present invention relates to a polyacetal resin composition which is prepared by melt-kneading a polyacetal with a thermoplastic polyurethane in the presence of a polyisocyanate compound, a polyisothiocyanate compound or a modification thereof, is capable of forming moldings having high impact strength and flex resistance, and free from the surface peeling and scarcely forms deposit on a mold.

[Prior Art]

As is well known, polyacetal resins are recently used in various fields as typical engineering plastics having excellent physical properties such as mechanical and electrical properties as well as excellent chemical properties such as chemical resistance and heat resistance. However, as the fields in which the polyacetal resins are used are widened, a further improvement in the properties thereof is required.

An example of the requirement is a higher impact resistance of moldings to be used as automobile parts in a wide temperature range. As one of the means for improving the impact resistance of the polyacetal resin, it was proposed to use a thermoplastic polyurethane as an agent for improving the impact resistance (see, for example, Japanese Patent Laid-Open No. 145243/1984 and 19652/1986).

Indeed polyacetal resin compositions having a desired impact resistance can be obtained by these processes proposed heretofore, but they have various defects because the interfacial adhesion of the polyacetal to the thermoplastic polyurethane is insufficient. More specifically the effect of the polyurethane in improving the impact resistance cannot be sufficiently exhibited. Further the strength of a weld of a molded product thereof is quite low. The polyacetal and the polyurethane are peeled from each other on the surface of the molded product to seriously impair the appearance of the product. Decomposition products of the polyacetal or polyurethane or substances peeled off therefrom arm deposited on the mold surface in the molding step to reduce the dimensional accuracy or to reduce the efficiency of the molding operation. Under these circumstances, it has been demanded to overcome these defects of the conventional processes.

[Summary of the Invention]

After intensive investigations made for the purpose of producing a polyacetal resin composition free from these defects, the inventors have found that the above-described defects can be overcome and a polyacetal resin composition having an excellent impact resistance can be obtained by melting the polyacetal resin together with the thermoplastic polyurethane in the presence of a compound having at least two isocyanate or isothiocyanate groups. The present invention has been completed on the basis of this finding.

Thus the present invention relates to a polyacetal resin composition prepared by melt-kneading a polyacetal resin (A) (99 to 40 wt. %) with a thermoplastic polyurethane (B) (1 to 60 wt. %) in the presence of a polyisocyanate compound, a polyisothiocyanate compound or a modification thereof (C) in an amount of 0.1 to 10 wt. % based on the total of A and B.

The polyacetal resin (A) used in the present invention is a polymeric compound comprising oxymethylene groups ($-CH_2O-$) as the main constituent unit. It may be any of polyoxymethylene homopolymers, copolymers (including block copolymers) comprising the oxymethylene groups and small amounts of other constituent units and terpolymers. The polyacetal resin is not limited to a linear one but a branched one and one having a crosslinked structure are also usable.

The homopolymer is produced usually by polymerizing anhydrous formaldehyde or trioxane which is a cyclic trimer of formaldehyde. Usually it is stabilized to thermal decomposition by end capping.

The copolymer is a polymeric compound having a number-average molecular weight of at least 5,000 and a melting point of at least 150° C. and comprising about 85 to 99.9% of recurring $-OCH_2-$ groups and groups of the general formula:

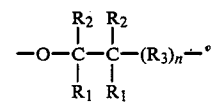

wherein $R_1$ and $R_2$ are selected from the group consisting of a hydrogen atom and lower alkyl and halogen-substituted lower alkyl groups, $R_3$ is selected from the group consisting of methylene, oxymethylene, lower alkyl substituted methylene, and haloalkyl-substituted methylene, lower alkyl-substituted oxymethylene and haloalkyl-substituted oxymethylene groups, n represents an integer of 0 to 3, and each of the lower alkyl groups has 1 or 2 carbon atoms, scattered in the molecule. Particularly preferred copolymers are those having oxyethylene groups ($-O-CH_2-CH_2-$).

Thermoplastic polyurethane (B) usable in the present invention is a reaction product comprising the following constituents (i), (ii) and (iii):

(i) a diisocyanate compound, (ii) a polymeric polyol having a molecular weight of 500 to 5,000, and (iii) a low-molecular polyol and/or polyamine having a molecular weight of 60 to 500.

The diisocyanate compounds (i) constituting the thermoplastic polyurethane (B) include, for example, 1,4-butylene diisocyanate, 1,6-hexamethylene diisocyanate, cyclopentylene 1,3-diisocyanate, 4,4'-dicyclohexylmethane diisocyanate, isophorone diisocyanate, cyclohexylene 1,4-diisocyanate, 2,4-tolylene diisocyanate, 2,6-tolylene diisocyanate, isomer mixtures of 2,4-tolylene diisocyanate with 2,6-tolylene diisocyanate, 4,4'-methylenebis(phenyl isocyanate), 2,2-diphenylpropane 4,4'-diisocyanate, p-phenylene diisocyanate, m-phenylene diisocyanate, xylene diisocyanate, 1,4-naphthylene diisocyanate, 1,5-naphthylene diisocyanate, 4,4'-naphthylene diisocyanate, 1,5-naphthylene diisocyanate, 4,4'-diphenyl diisocyanate, azobenzene 4,4'-diisocyanate, m- or p-tetramethylxylene diisocyanate and 1-chlorobenzene 2,4-diisocyanate. Among them, 4,4'-methylenebis(phenyl isocyanate), 1,6-hexamethylene diisocyanate, 2,4-tolylene diisocyanate, and isophorone diisocyanate are particularly preferred.

The polymeric polyols (ii) constituting the thermoplastic polyurethane (B) are those having a molecular weight of 500 to 5,000, preferably 1,000 to 3,000 and capable of forming a flexible segment of the polyurethane (B). The polymeric polyols are mainly polyester diols (including polycarbonate diols) and polyether diols having hydroxyl groups at both ends. A part thereof may be a triol or the like.

The suitable polyester diols are those prepared from one or more dihydric alcohols and one or more dicarboxylic acids. Suitable dicarboxylic acids constituting them include, for example, adipic acid, succinic acid, sebacic acid, suberic acid, methyladipic acid, glutaric acid, pimelic acid, azelaic acid, thiodipropionic acid, citraconic acid and mixtures of them containing a small amount of an aromatic dicarboxylic acid. Suitable dihydric alcohols usable as the other constituent include, for example, 1,3- and 1,2-propylene glycol, 1,4-butanediol, 1,3-butanediol, 2-methylpentanediol, 1,5-diethylene glycol, 1,5-pentanediol, 1,6-pentanediol, 1,12-dodecanediol and mixtures of them.

Further hydroxyl carboxylic acids, lactones and carbonates, such as $\epsilon$-caprolactone and 3-hydroxylbutyric acid, can be used as the constituent of the polyester diol.

Preferred polyesters are polyadipate diols, polylactone diols and polyacrbonate diols.

Preferred polyether diols are condensates of one or more alkylene glycols such as ethylene glycol, 1,2- or 1,3-propylene glycol, 1,4-butanediol, 1,5-pentanediol and mixtures of them. Preferred polyalkylene ether glycols can be produced also from tetrahydrofuran. The polyether diols may also be ether glycols in the form of comonomers, particularly random comonomers or block comonomers, derived from ethylene oxide, propylene oxide and/or tetrahydrofuran (THF). Further THF polyether copolymer with a small amount of 3-methyl-THF can also be used.

Particularly preferred polyether diols are poly(tetramethylene ether) glycol (PTMEG), poly(propylene oxide) glycol, propylene oxide/ethylene oxide copolymer and tetrahydrofuran/ethylene oxide copolymer. Among them, poly(tetramethylene ether) glycol is most preferred.

The suitable polymer diols further include those having the main chain mainly comprising a hydrocarbon, such as polybutanediol.

The low-molecular polyol and/or polyamine (iii) having a molecular weight of 60 to 500 constituting the thermoplastic polyurethane (B) is one or more of aliphatic straight-chain diols or diamines or aromatic diols or diamines which may partially contain a small amount of a triol. This component forms a rigid segment of the polyurethane (B) and are effective in lengthening the chain and crosslinking.

Preferred low-molecular polyols include, for example, 1,2-ethanediol, 1,2-propanediol, 1,3-propanediol, 1,4-butanediol, 1,5-pentanediol, 1,6-hexanediol, 1,4-cyclohexanediol, ethylene glycol, propylene glycol, glycerol, hexanetriol, trimethylolpropane, hydroquinone diethylol ether and resorcinol ethylol ether. The polyamines include, for example, diphenylmethanediamine, m-phenylenediamine and derivatives of them. Preferred examples of them include ethylene glycol, propylene glycol, 1,2-ethanediol, 1,4-butanediol, 1,6-hexanediol, glycerol, hydroquinone diethylol ether, resircinol diethylol ether and derivatives of them.

The thermoplastic polyurethane (B) comprising the above-described reaction product preferably comprises 1 equivalent of the polymeric polyol (ii) and about 0.2 to 5 equivalents of the low-molecular polyol and/or polyamine (iii). The large the amount of the component (ii), the more flexible the composition. Thus the amount of the component (ii) exerts an influence on the regidity of the composition.

The weight ratio of the polyacetal resin (A) to the thermoplastic polyurethane (B) is 99 to 40/1 to 60, preferably 97 to 50/3 to 50.

The present invention is characterized in that the polyacetal resin (A) is melt-kneaded with the thermoplastic polyurethane (B) in the presence of a polyisocyanate compound, a polyisothiocyanate compound or a modification thereof (C), preferably a diisocyanate compound, a diisothiocyanate compound or a modification thereof.

Preferred diisocyanate of diisothiocyanate compounds (C) usable in the present invention are compounds of the general formula: $O=C=N-R-N=C=O$ or $S=C=N-R-N=C=S$ (wherein R is a divalent group) and modifications of them.

Examples of them include, for example, 4,4'-methylenebis(phenyl isocyanate), 2,4-tolylene diisocyanate, 2,6-tolylene diisocyanate, xylylene diisocyanate, 1,6-hexamethylene diisocyanate, isophorone diisocyanate, 1,5-naphthalene diisocyanate, various diisothiocyanates corresponding to them, dimers and trimers of them and compounds wherein the isocyanate group (—NCO) is protected by some means. From the viewpoint of the properties such as discoloration thereof in the course of the melt kneading or the safety in the handling, particularly preferred are 4,4'-methylenebis(phenyl isocyanate), isophorone diisocyanate, 1,5-naphthalene diisocyanate, 1,6-hexamethylene diisocyanate, 2,4-tolylene diisocyanate, 2,6-tolylene diisocyanate and modifications (or derivatives) such as dimers and trimers of them.

By conducting the melt kneading in the presence of the polyisocyanate compound or polythioisocyanate compound (C), the object of the present invention can be attained. Namely, a high impact resistance is exhibited in a wide temperature range; the tenacity and flex resistance are improved; the strength and elongation of the welds of the moldings are improved; peeling of the surfaces of the moldings are prevented; and the composition hardly forms deposit on the mold. Such remarkable effects cannot be obtained when only (A) and (B) are used.

From an increase in the viscosity (reduction in the MI), it is supposed that the component (C) reacts with the polyacetal resin (A) and/or the thermoplastic polyurethane (B) in the melt kneading step to occasionally form a partial three-dimensional structure to thereby increase the affinity of them for each other and improve the interfacial adhesion.

The amount of the polyisocyanate or polyisothiocyanate compound (C) used herein ranges from 0.1 to 10 wt. % based on the total of (A) and (B). When the amount of the component (C) is insufficient, any sufficient effect of causing the interfacial adhesion between the polyacetal resin and the polyurethane cannot be exhibited and the above-described effects cannot be obtained.

On the contrary, as the amount of the polyisocyanate or polyisothiocyanate compound is increased, the fluidity of the polyacetal resin composition is reduced to cause problems of the moldability, etc. Therefore, the amount of the component (C) used in the present invention is 0.1 to 10 wt. %, preferably 0.3 to 5 wt. %, based on the total resin components A and B.

It is desirable to incorporate various known stabilizers in the composition of the present invention to increase its stability. Particularly important additives to be incorporated therein include, for example, antioxidants (D), heat stabilizers (decomposition inhibitors) (E) and weather (light) stabilizers (F).

The antioxidants (D) include sterically hindered phenols and amines capable of preventing the oxidation or decomposition by radical reaction. They are, for example, 2,2'-methylenebis(4-methyl-6-t-butylphenol), hexamethylene glycol bis(3,5-di-t-butyl-4-hydroxyhydrocinnamate), tetrakis[methylene(3,5-di-t-butyl-4-hydroxyhydrocinnamate)]methane, triethylene glycol bis-3-(3-t-butyl-4-hydroxy-5-methylphenyl)propionate, 1,3,5-trimethyl-2,4,6-tris(3,5-di-t-butyl-4-hydroxybenzyl)benzene, n-octadecyl 3-(4'-hydroxy-3',5'-di-t-butylphenyl)-propionate, 4,4'-methylenebis(2,6-di-t-butylphenol), 4,4'-butylidene-bis(6-t-butyl-3-methylphenol), 2,2'-thiodiethyl bis[3-(3,5-di-t-butyl-4-hydroxyphenyl)propionate], distearyl 3,5-di-t-butyl-4-hydroxybenzylphosphonate and 2-t-butyl-6-(3-t-butyl-5-methyl-2-hydroxybenzyl)-4-methylphenyl acrylate. They can be used either solely or in the form of a mixture of two or more of them.

Among them, particularly preferred are hexamethylene glycol bis(3,5-di-t-butyl-4-hydroxyhydrocinnamate), tetrakis[methylene(3,5-di-t-butyl-4-hydroxyhydrocinnamate)]methane and triethylene glycol bis-3-(3-t-butyl-4-hydroxy-5-methylphenyl)propionate. 0.01 to 3 wt. %, based on the total composition, of one or more of them can be added to the composition of the present invention.

The heat stabilizers (E) combine with an acid or formalin to eliminate troubles (such as decomposition) caused by it. They include, for example, hydroxides of ammonium, alkali metals and alkaline earth metals, inorganic salts thereof, salts thereof with organic acids such as carboxylic acids and alkoxides of them; amine compounds such as alkyl- and alkoxylamines; amidine compounds such as dicyandiamide, melamine and their derivatives; amide compounds such as alkylamides and polyamides; and other nitrogenous organic polymers such as polyvinylpyrrolidone. These stabilizers are used also in an amount of 0.01 to 3 wt. %, based on the total composition. When the heat stabilizer (E) is used in combination with the antioxidant (D), a particularly stable composition can be obtained.

The weather (light) stabilizers (F) are those capable of inhibiting the decomposition due to light or caused by exposure to air. They include, for example, benzotriazoles, benzophenones, aromatic benzoates and hindered amines (piperidine) derivatives having a sterically hindered group). They are used either solely or in the form of a mixture of two or more of them.

Examples of them include 2-(2'-hydroxy-5'-methylphenyl)benzotriazole, 2-(2'-hydroxy-3',5'-di-t-butylphenyl)benzotriazole, 2-(3,5-di-t-amyl-2-hydroxyphenyl)benzotriazole, 2-(2'-hydroxy-3',5'-diisoamylphenyl)benzotriazole, 2-[2-hydroxy-3,5-bis(α, α-dimethylbenzyl)phenyl]benzotriazole, 2-(2'-hydroxy-4'-octoxyphenyl)benzotriazole, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, 2-hydroxy-4-oxybenzylbenzophenone, p-t-butylphenyl salicylate, p-octylphenyl salicylate, 2-ethylhexyl 2-cyano-3,3'-diphenylacrylate, ethyl 2-cyano-3,3'-diphenylacrylate, N-(2-ethylphenyl)N'-(2-ethoxy-5-t-butylphenyl)oxamide and N-(2-ethylphenyl)-N'-(2-ethoxyphenyl)oxamide.

The hindered amines include, for example, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzoyoxy-2,2,6,6-tetramethylpiperidine, 4-(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethylpiperidyl) sebacate, bis(2,2,6,6-tetramethyl-4-piperidyl) terephthalate, 1,2-bis(2,2,6,6-tetramethyl-4-piperidyloxy)ethane, bis(2,2,6,6-tetramethyl-4-piperidyl) hexamethylene-1,6-dicarbamate, bis(1-methyl-2,2,6,6-tetramethyl-4-piperidyl) adipate and tris(2 2,6,6-tetramethyl-4-piperidyl)benzene-1,3,5-tricarboxylate.

Further high-molecular piperidine derivative polycondensates such as dimethyl succinate/1-(2-hydroxyethyl)-4-hydroxy-2,2,6,6-tetramethylpiperidine polycondensate are also effective.

The amount of the weather (light) stabilizer is also 0.01 to 3 wt. % based on the total composition.

The use of the weather (light) stabilizer (F) is particularly desirable in a composition containing the polyurethane (B) of the present invention. From the viewpoint of the stability of the composition of the present invention, it is particularly preferred to use the weather (light) stabilizer in combination with the above-described antioxidant and heat stabilizer.

Further various known additives can be incorporated in the composition of the present invention in order to improve the physical properties thereof depending on the use thereof. The additives include, for example, colorants, lubricants, releasing agents, nucleating agents, surfactants, other polymers, organic polymeric improvers, and fibrous, powdery or lamellar fillers comprising an inorganic, organic or metallic substance. These additives can be used either solely or in the form of a mixture of two or more of them.

The composition of the present invention and its moldings are prepared essentially by melt-kneading the component (A) with the component (B) in the presence of the component (C). The kneading is conducted preferably at a temperature ranging from the melting point of the component (A) to 270° C. for at least 30 sec. The preparation process is not particularly limited. Usually known apparatus and process for the preparation of a synthetic resin composition or its moldings can be employed. More particularly, necessary components are mixed together, the mixture is kneaded with a single-screw extruder, twin-screw extruder or another melt-kneading apparatus to form pellets and the pellets are molded. To further improve the effect of the present invention, the components are homogeneously dispersed and mixed by a process wherein a part of or the whole resin components are finely pulverized, mixed and melt-extruded and the pellets thus formed are molded, or a process wherein a part of the components constituting the composition [for example, a part of the components (C) and (A)] is previously melt-kneaded to form a master batch, which is then kneaded with the remaining components to obtain the intended composition or moldings.

Although the composition of the present invention or the moldings per se have the excellent physical properties as described above, the physical properties can be further improved and stabilized by heat-treating the composition or the moldings at a temperature of 80° C. or higher.

The above-described stabilizers and additives can be incorporated in the composition in any step. As a matter of course, they can be incorporated or mixed therein immediately before forming the final moldings.

The resin composition of the present invention can be molded by any of extrusion, injection, compression, vacuum, blow and foaming molding processes.

The invention is superior to conventional compositions prepared merely by melt-kneading the polyacetal resin with the thermoplastic polyurethane in the absence of any polyisocyanate compound in the following points: the affinity of the components for one another is improved; the surface layer of the molding is not peeled; no mold deposit is formed in the molding step; the weld strength, weld elongation and flex resistance are remarkably improved; an excellent impact resistance can be attained in a wide temperature range; and it is usable as a suitable material for automobile parts (such as clips, fasteners, trims, wheel covers, etc.).

[EXAMPLES]

The following Examples will further illustrate the present invention, which by no means limit the invention.

EXAMPLES 1 to 15

A polyacetal copolymer (A) (trade name Duracon, a product of Polyplastics Co., Ltd.) was mixed with a thermoplastic polyurethane (B) (trade name: Miractran, a product of Nihon Miractran Co., Ltd.) in the presence of a polyisocyanate or polythioisocyanate compound (C) as shown in Table 1. The mixture was melt-kneaded with a twin-screw extruder at a resin temperature of 210° C. to form a composition in the form of pellets. Test pieces were prepared from the pellets by injection molding and evaluated.

EXAMPLE 16

90 parts by weight of the same polyacetal resin and that used in Example 4 was mixed with 10 parts by weight of the same polyisocyanate compound as that used in Example 4. The mixture was melt-kneaded with the twin-screw extruder at a resin temperature of 210° C. to form pellets having a high polyisocyanate concentration. A predetermined amount of the pellets were mixed with the remaining polyacetal resin and polyurethane. The mixture was melt-kneaded to obtain the same composition as that of example 4 and pellets of the composition were prepared. Test pieces were prepared from the pellets by injection molding and evaluated.

Comparative Examples 1 to 10

Compositions free from the polyisocyanate compound or polythioisocyanate compound were also evaluated to obtain the results shown in Table 1. The items and methods of the evaluation were as follows:

(1) Melt index (MI):

The melt index (g/10 min) was determined at 190° C.

(2) Izod impact test:

Izod impact strengths (kg.cm/cm) of test pieces having a thickness of 6.4 mm were determined according to ASTM D 256.

(3) Weld strength and elongation:

Rod-shaped test pieces having gates at both ends were prepared by molding and the strength (kg/cm$^2$) and elongation (%) of the weld were determined.

(4) Mold deposit:

The test pieces (28×6×2 mm) were prepared by molding (7500 shots) and the mold deposit on the inner wall of the mold cavity and the outer wall of the mold was observed visually. The results were classified into ranks 1 to 5 depending on the amount of the deposit. The best result was represented by 1 and the worst one by 5.

Molding conditions:
cylinder temperature: 200° C.
mold temperature: 25° C.

Figure 1A:
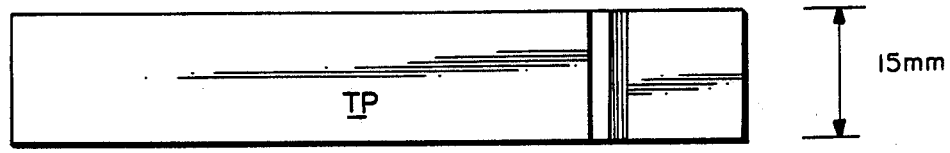
FIGS. 1(a) to (c) are diagrams showing the test pieces used in the tests of the surface peeling and flex resistance, wherein (a) is a plan, view (b) is a front view, and (c) is an enlarged view of the bend.
Figure 1B:
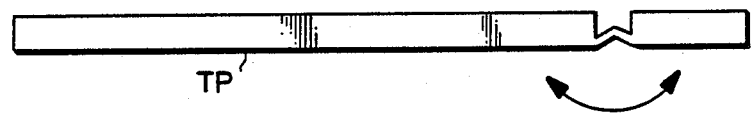
Figure 1C:
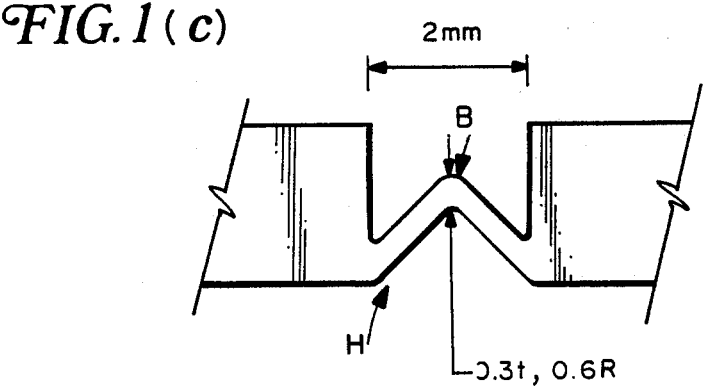

(5) The surface peeling:

Test pieces having a shape as shown in FIG. 1 were prepared and the peeling of the surface layer and the unevenness of the color were visually observed.

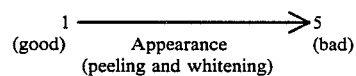

1 ——————————→ 5
(good)    Appearance    (bad)
(peeling and whitening)

(6) Flex resistance:

Moldings having a hinge as shown in FIG. 1 were bent at an angle of 180° (in a direction shown by an arrow in FIG. 1) at 23° C. at a relative humidity of 50% to examine their durabilities.

The number (n) of the samples was 10.

After bending at 180° once, the appearance of the bend was visually observed and the results were classified according to the following criteria and shown in terms of the average of them:

1: Substantially no change was observed.
2: Fine cracks were formed at the bend and it was whitened.
3: Fine cracks were slightly enlarged, while the elasticity was kept.
4: The molding was broken at the bend into two pieces, which were tied together only at the surface part.
5: The molding was broken.

TABLE 1

| | | Example | | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Polyacetal resin | | | | | | | | | | | | | | | | | |
| (1) | wt. % | 88.4 | 79 | 78.9 | 78.4 | 77.4 | 78.4 | 78.4 | 78.4 | 68.4 | | 88.4 | 78.4 | 68.4 | 78.4 | 78.1 | 78.4 |
| (2) | " | | | | | | | | | | 78.4 | | | | | | |
| Thermoplastic polyurethane | | | | | | | | | | | | | | | | | |
| (3) | " | 10 | 20 | 20 | 20 | 20 | 20 | 20 | 20 | 30 | 20 | 10 | | | | | 20 |
| (4) | " | | | | | | | | | | | | 20 | 30 | | | |
| (5) | " | | | | | | | | | | | | | | 20 | | |
| (6) | " | | | | | | | | | | | | | | | 2.0 | |
| Polyisocyanate or polyisothiocyanate compound | | | | | | | | | | | | | | | | | |
| isophorone diisocyanate (trimer) | " | 1.0 | 1.0 | 0.5 | 1.0 | 2.0 | | | | 1.0 | 1.0 | 1.0 | 1.0 | 1.0 | 1.0 | 1.0 | 1.0 |
| isophorone diisocyanate (dimer) | " | | | | | | 1.0 | | | | | | | | | | |
| 4,4'-methylenebis(phenyl isocyanate) | " | | | | | | | 1.0 | | | | | | | | | |
| diisothiocyanate | " | | | | | | | | 1.0 | | | | | | | | |
| Antioxidant (7) | " | 0.5 | — | 0.5 | 0.5 | 0.5 | 0.5 | 0.5 | 0.5 | 0.5 | 0.5 | 0.5 | 0.5 | 0.5 | 0.5 | 0.5 | 0.5 |
| Heat stabilizer (8) | " | 0.1 | — | 0.1 | 0.1 | 0.1 | 0.1 | 0.1 | 0.1 | 0.1 | 0.1 | 0.1 | 0.1 | 0.1 | 0.1 | 0.1 | 0.1 |
| Weather (light) (9) stabilizer | " | — | — | — | — | — | — | — | — | — | — | — | — | — | — | 0.3 | — |
| Melt index | g/10 min | 0.50 | 0.20 | 1.0 | 0.15 | 0.04 | 6 | 3 | 3 | 0.10 | 1.8 | 0.50 | 0.20 | 0.10 | 0.17 | 0.20 | 0.15 |
| Izod impact strength (with notch) | kg·cm/cm | 11 | 20 | 16 | 21 | 26 | 18 | 27 | 19 | 28 | 13 | 11 | 17 | 30 | 17 | 18 | 24 |
| Weld strength | kg/cm² | 460 | 375 | 360 | 362 | 376 | 353 | 360 | 350 | 320 | 350 | 490 | 360 | 325 | 370 | 360 | 360 |
| Weld elongation | % | 25 | 12 | 10 | 13 | 19 | 12 | 25 | 14 | 15 | 9.2 | 20 | 11 | 14 | 14 | 14 | 16 |
| Mold deposit | | 1 | 1 | 2 | 1 | 1 | 3 | 1 | 2 | 1 | 1 | 1 | 1 | 1 | 1 | 1 | 1 |
| Surface peeling | | 1 | 1 | 1 | 1 | 1 | 2 | 1 | 2 | 1 | 1 | 1 | 1 | 1 | 1 | 1 | 1 |
| Flex resistance | | 2.5 | 1.9 | 1.7 | 1.3 | 1.2 | 1.5 | 1.5 | 1.5 | 1.0 | 1.8 | 2.7 | 1.8 | 1.0 | 1.5 | 1.5 | 1.2 |

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| (A) Polyacetal resin | | | | | | | | | | | |
| (1) | wt. % | 89.4 | 80 | 79.4 | 69.4 | 79.4 | 89.4 | 79.4 | 69.4 | 79.4 | 79.1 |
| (2) | " | | | | | | | | | | |
| (B) Thermoplastic polyurethane | | | | | | | | | | | |
| (3) | " | 10 | 20 | 20 | 30 | 20 | | | | | |
| (4) | " | | | | | | 10 | 20 | 30 | | |
| (5) | " | | | | | | | | | 20 | |
| (6) | " | | | | | | | | | | 20 |
| (C) Polyisocyanate or polyisothiocyanate compound | | | | | | | | | | | |
| isophorone diisocyanate (trimer) | " | | | | | | | | | | |
| isophorone diisocyanate (dimer) | " | | | | | | | | | | |

TABLE 1-continued

| | | | | | | | | | | | |
|---|---|---|---|---|---|---|---|---|---|---|---|
| 4,4'-methylenebis(phenyl isothiocyanate) | " | 0.5 | — | 0.5 | 0.5 | 0.5 | 0.5 | 0.5 | 0.5 | 0.5 | 0.5 |
| (D) Antioxidant (7) | " | 0.1 | — | 0.1 | 0.1 | 0.1 | 0.1 | 0.1 | 0.1 | 0.1 | 0.1 |
| (E) Heat stabilizer (8) | " | — | — | — | — | — | — | — | — | — | 0.3 |
| (F) Weather (light) (9) stabilizer | | | | | | | | | | | |
| (1) Melt index | g/10 min | 7.9 | 7.3 | 6.9 | 6.5 | 24 | 10.0 | 10.9 | 11.0 | 7.0 | 10.8 |
| (2) Izod impact strength (with notch) | kg·cm/cm | 8.5 | 12 | 13 | 14 | 10 | 8.2 | 10 | 13 | 9.8 | 14 |
| (3) Weld strength | kg/cm² | 300 | 290 | 288 | 154 | 212 | 310 | 295 | 175 | 283 | 203 |
| Weld elongation | % | 10 | 8.2 | 8.4 | 3.6 | 6.5 | 9.5 | 7.5 | 3.5 | 8.7 | 4.8 |
| (4) Mold deposit | — | 5 | 5 | 5 | 5 | 5 | 5 | 5 | 5 | 5 | 5 |
| (5) Surface peeling | — | 4 | 5 | 5 | 5 | 5 | 5 | 5 | 5 | 5 | 5 |
| (6) Flex resistance | — | 4.8 | 4.5 | 4.3 | 4.7 | 4.5 | 4.9 | 4.8 | 4.8 | 4.7 | 4.7 |

We claim:

1. A polyacetal resin composition prepared by melt-kneading a polyacetal resin (A) (99 to 40 wt. %) with a thermoplastic polyurethane (B) (1 to 60 wt. %) in the presence of a polyisocyanate compound, a polyisothiocyanate compound or a dimer or trimer thereof (C) in an amount of 0.1 to 10 wt. % based on the total of A and B.

2. A polyacetal resin composition according to claim 1, wherein the polyacetal resin (A) is at least one of polymers comprising oxymethylene groups as the main constituent unit and selected from the group consisting of oxymethylene homopolymer, oxymethylene copolymers (including block copolymers) and graft or crosslinked oxymethylene polymers.

3. A polyacetal resin composition according to claim 1 or 2, wherein the polyisocyanate compound, polyisothiocyanate compound (C) is a diisocyanate compound, a diisothiocyanate compound or a dimer or trimer thereof.

4. A polyacetal resin composition according to any of claim 1, wherein the polyisocyanate compound or its modification (C) is one or more compounds selected from the group consisting of 4,4′-methylenebis(phenyl isocyanate), isophorone diisocyanate, 1,5-naphthalene diisocyanate, 1,6-hexamethylene diisocyanate, 2,4-tolylene diisocyanate, 2,6-tolylene diisocyanate and dimers and trimers of them.

5. A polyacetal resin composition according to any of claim 1, wherein the thermoplastic polyurethane (B) is a product comprising the following compounds (i), (ii) and (iii):
   (i) a diisocyanate compound,
   (ii) a polymeric polyol having a molecular weight of 500 to 5,000, and
   (iii) a low-molecular weight polyol and/or polyamine having a molecular weight of 60 to 500.

6. A polyacetal resin composition according to claim 5, wherein the diisocyanate compound (i) constituting the thermoplastic polyurethane (B) is at least one compound selected from the group consisting of 4,4′-methylenebis(phenyl isocyanate), 1 6-hexamethylene diisocyanate, 2,4-tolylene diisocyanate and isophorone diisocyanate.

7. A polyacetal resin composition according to claim 5, wherein the polymeric polyol (i) constituting the thermoplastic polyurethane (B) has a molecular weight of 1,000 to 3,000.

8. A polyacetal resin composition according to claim 5, wherein the polymeric polyol (ii) constituting the thermoplastic polyurethane (B) mainly comprises one or more of polyester diols and polyether diols.

9. A polyacetal resin composition according to claim 5, wherein the polymeric polyol (ii) constituting the thermoplastic polyurethane (B) mainly comprises one or more diols selected from the group consisting of polyadipate diols, polyalkylene ether diols, polylactone diols and polycarbonate diols.

10. A polyacetal resin composition according to claim 5, wherein the low-molecular polyol and/or polyamine (iii) having a molecular weight of 60 to 500 constituting the thermoplastic polyurethane (B) mainly comprises an aliphatic diol or diamine or an aromatic diol or diamine.

11. A polyacetal resin composition according to claim 5 or 10, wherein the low-molecular polyol (iii) having a molecular weight of 60 to 500 constituting the thermoplastic polyurethane (B) is ethylene glycol, propylene glycol, 1,2-ethanediol, 1,4-butanediol, 1,6-hexanediol, glycerol, hydroquinone diethylol ether, resorcinol diethylol ether or a derivative thereof.

12. A polyacetal resin composition according to any of claim 1, which further contains 0.01 to 3 wt. %, based on the total composition, of an antioxidant (D).

13. A polyacetal resin composition according to any of claim 1, which further contains 0.01 to 3 wt. %, based on the total composition, of a heat stabilizer (E).

14. A polyacetal resin composition according to any of claim 1, which further contains 0.01 to 3 wt. %, based on the total composition, of a weather (light) stabilizer (F).

* * * * *

UNITED STATES PATENT AND TRADEMARK OFFICE
CERTIFICATE OF CORRECTION

PATENT NO. : 4,929,712

DATED : May 29, 1990

INVENTOR(S) : Sugiyama et al

Page 1 of 2

It is certified that error appears in the above-identified patent and that said Letters Patent is hereby corrected as shown below:

Column 1, line 10, after "thereof" delete the comma and insert --. The composition--;
      line 11, after "resistance," delete "and" and insert --that are-- and after "from" delete "the";
      line 12, after "and" delete "scarcely" and insert --rarely--, after "forms" insert --mold-- and after "deposit" delete "on a mold" and insert a period (.); change "deposit" to --deposits--;
      line 37, after "resistance" delete "cannot be sufficiently exhibited" and insert --is insufficient--;
      line 39, after "and" delete "the";
      line 40, after "thane" delete "are"; change "peeled" to --peel-- and before "from" insert --away--;
      line 43, after "peeled" delete "off'' and after "therefrom" change "arm" to --are--;
      line 47, after "demanded" delete "to overcome" and insert --that--;
      line 48, after "processes" insert --be overcome--;
      line 55, before "and" insert --(--;
      line 57, after "obtained" insert --)--.

Column 2, line 12, after "stabilized" delete "to" and insert --against--;
      line 50, delete "2,4-tolylene and insert --2,4-tolulene--;
      line 51, delete "2,4-tolylene and insert --2,4-tolulene--;
      line 52, delete "2,6-tolylene and insert --2,6-tolulene--;

UNITED STATES PATENT AND TRADEMARK OFFICE
CERTIFICATE OF CORRECTION

PATENT NO. : 4,929,712

DATED : May 29, 1990

INVENTOR(S) : Sugiyama et al

It is certified that error appears in the above-identified patent and that said Letters Patent is hereby corrected as shown below:

Column 3, line 21, change "polyacrbonate" to --polycarbonate--;
line 58, after "and" insert --their-- and after "derivatives" delete "of them".

Column 4, line 20, change "tolylene" to --tolulene--;
line 39, after "resistance" insert --properties--;
line 40, before "peeling" insert --surface-- and after "peeling" delete "of the";
line 41, delete "surfaces", after "moldings" delete "are" and insert --surface--;
line 42, delete "hardly" and insert --rarely-- and after "forms" delete "deposit on the mold" and insert --mold deposits--.

Column 5, line 32, delete "troubles" and insert --problems--;
line 33, delete "caused by it" and insert --that such compounds cause--.

Column 7, line 30, after "plan" delete "," and after "view" insert --,--.

Signed and Sealed this

Thirty-first Day of December, 1991

Attest:

HARRY F. MANBECK, JR.

*Attesting Officer*   Commissioner of Patents and Trademarks